Jan. 21, 1969 AKIRA ABE ET AL 3,423,576
REVERSIBLE COUNTING CIRCUIT APPARATUS
Filed Oct. 26, 1965
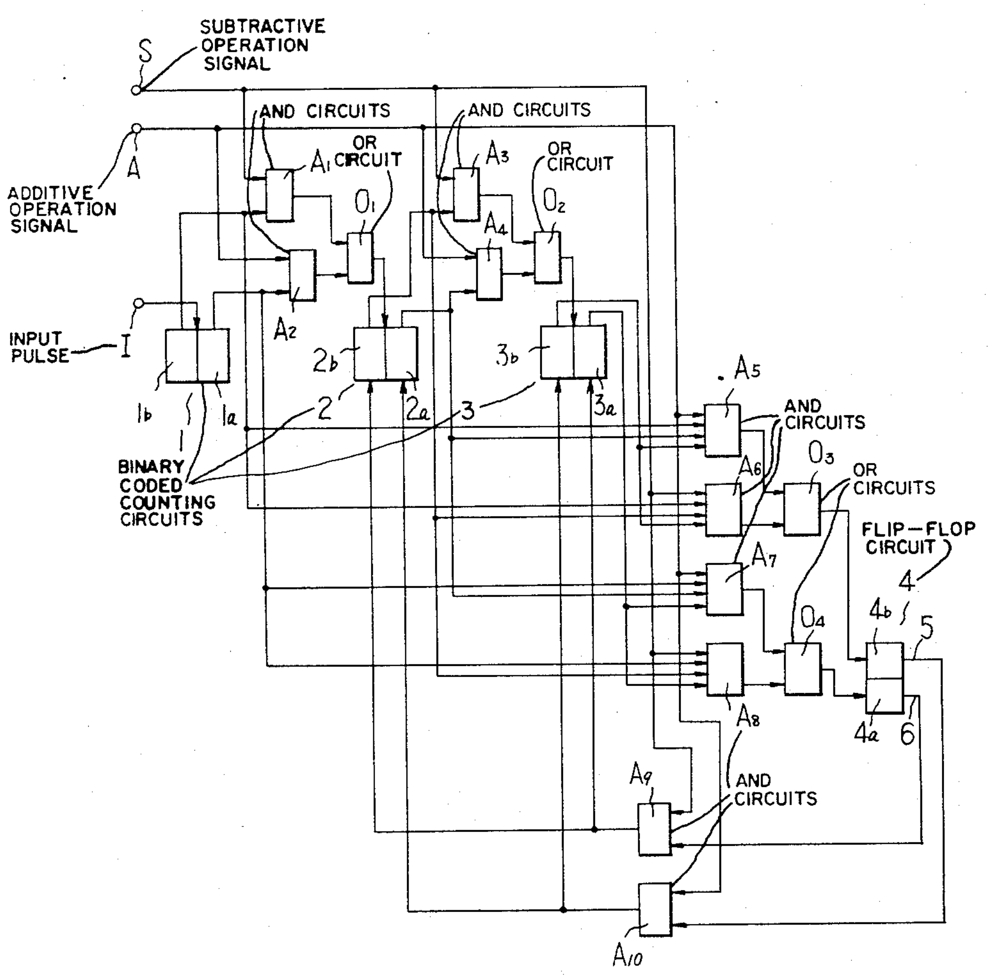
AKIRA ABE
ISAO HATANO
BY
Kurt Kelman United States Patent Office 3,423,576

Patented Jan. 21, 1969

3,423,576
REVERSIBLE COUNTING CIRCUIT APPARATUS

Akira Abe, Takatsuki-shi, and Isao Hatano, Kyoto-fu, Japan, assignors to Tateisi Electronics Co., Kyoto-shi, Japan, a corporation of Japan Filed Oct. 26, 1965, Ser. No. 505,261
Claims priority, application Japan, Oct. 31, 1964, 39/61,937
U.S. Cl. 235—92 4 Claims
Int. Cl. G06f 7/38; G06g 7/00

This invention relates to a reversible counting circuit apparatus and more particularly relates to a counting circuit apparatus in which the output states of unit counting circuits representing the resultant value of a mathematical operation are selected to be the same independent of the fact whether the resultant value is derived from an additive operation or a subtractive provided that the resultant value is the same.

An object of the invention is to provide an improved reversible counting circuit apparatus in which any number coded system is provided by using a binary coded counting circuit as the unit circuit of a counting circuit, said counting circuit being capable of an additive operation and a subtractive operation, reversibly, and the output states of the unit circuits representing the resultant value of a mathematical operation are made the same independent of the fact whether the resultant value is derived from an additive operation or a subtractive operation provided that the resultant value is the same.

It is known to provide a counting circuit of any number coded system, such as a decimal coded counting circuit other than $2^n$ coded system, in which circuit is constituted by using a binary coded counting circuit as a unit circuit, four unit circuits being connected in cascade, and a feedback circuit is provided to reverse the unit circuit in the preceding stage to restore all of the unit circuits by means of using the 10th pulse. However, in the counting circuit of any number coded system stated above, when a signal driving the following unit circuit is taken out of the output opposite to that used when the additive operation is effected, in other words when a subtractive operation is effected, the output states of the unit circuits become different depending on whether the mathematical operation is an additive one or a subtractive one even when the resultant value of the mathematical operation is the same. It will be explained in more detail as follows: When the output states of the unit circuits become the same, it means that the resultant value of mathematical operation is different depending on whether the operation is an additive one or a subtractive one.

This will be still further explained as follows by means of using an example: it is assumed that when a decimal coded counting circuit is constituted by combining 4 binary coded counting circuits, for example, the 8th pulse is applied in an additive operation, the second and third unit circuits are reversed by the output of the fourth unit circuit; the output states of the first to the fourth unit circuits skip by using a feedback circuit to the output states obtained when a 14th pulse is applied to a decimal coded counting circuit providing no feedback circuit so that in that all of the unit circuits restore the original state, in other words the state in which no pulse is applied to the counting circuit, when ten pulses are supplied. In the decimal coded counting circuit under a subtractive operation, for example, when the fourth pulse is applied (then, the resultant value of the mathematical operation is 6), the output states of the first to fourth unit circuit are to be the output states obtained when a 12th pulse is applied to a decimal coded counting circuit providing no feedback circuit. However, the output states do not then exist since the feedback signal coming from the feedback circuit eliminates the output states. In consequence, even if the resultant value of the mathematical operation is the same, such as 6, derived from the additive operation or the subtractive operation, the output states of the unit circuits are not the same according to the means by which the additive operation or the subtractive operation is effected. This phenomenon renders the circuit inoperative for use in both additives and subtractive counting.

In accordance with the present invention, there is provided a counting circuit apparatus in which the output states of the unit circuits derived from the result of an additive operation are the same as the output states of the unit circuits derived from the result of a subtractive operation provided that the resultant value is the same. In the present invention, a flip-flop circuit is utilized as the last counting circuit in place of a binary coded counting circuit, and the set signal and the reset signal of the flip-flop circuit are obtained from the outputs of an AND circuit having as its inputs the outputs of the preceding unit circuits and an additive or subtractive signal. The preceding unit circuits are reversed by one of the outputs of the flip-flop circuit so that the output skipped when an additive operation is effected is also skipped when a subtractive operation is to be effected.

A better understanding of the present invention may be had when the following detailed description is read in connection with the single accompanying drawing, in which, The single figure is a block connection diagram showing an embodiment of the reversible counting circuit apparatus of the present invention.

As will be apparent from the following description, the reversible counting circuit of the present invention has $m-1$ binary coded counting circuits, and a flip-flop circuit. The binary coded counting circuits and the flip-flop circuit have $2^m$ coded counting capacity, and are constituted to be able to operate as an arbitrary number other than $2^n$ coded counting capacity, where $m>n$.

In the single figure, three binary coded counting circuits 1, 2 and 3 and a flip-flop circuit 4 comprise a 16 coded counting circuit and the 16 coded counting circuit is utilized as a decimal coded circuit. Each of the circuits 1–4 has two sections designated by the same respective reference characters with a subscript *a* and a subscript *b*, respectively. In an additive operation when a fifth pulse is applied, the output states of the unit circuits skip to an output state obtained when an 11th pulse is applied to a counting circuit having no feedback circuit. On the contrary, in a subtractive operation when a sixth pulse is applied, the output state of the unit circuits skip to an output state the same as the output state obtained when a fourth pulse is applied to the counting circuit in the additive operation. Therefore, in the additive and subtractive operations, the output states to be obtained when the fifth to the tenth pulses are given are skipped.

Reference letters A1 to A10 denote AND circuits, 01 to 04 OR circuits, I a terminal for an input pulse, A a terminal for a signal of additive operation and S a terminal for a signal of subtractive operation. The binary coded counting circuit 1 reverses the output state thereof each time when an input pulse is applied to terminal I. The binary counting circuit 2 reverses the output state thereof each time when an output signal from OR circuit 01 is applied thereto. The binary counting circuit 3 reverses the output state thereof each time when an output signal from OR circuit $\mathbf{0_2}$ is applied thereto, The flip-flop circuit 4 issues an output from a first output terminal 5 when the output of an OR circuit 3 is applied thereto as a set signal and issues an output from a second output terminal 6 when an output of the OR circuit 4 is applied thereto as a reset signal. A feedback circuit is provided so that the outputs of AND circuits A9 and A10 reverse the binary counting circuits 2 and 3.

ADDITION

In the construction stated above, it is first assumed that the counting circuits are in a stable state when no input pulse is applied to counting circuits 1 to 3 and flip-flop circuit 4, and that outputs issue respectively from sections 1*a* to 4*a* of counting circuits 1 to 3 and flip-flop circuit 4. In an additive operation, as a signal is applied to terminal A, circuit 1 reverses its state to issue an output from section 1*b* thereof when the first pulse is applied to terminal I. When the second pulse is applied to terminal I, an output issues from section 1*a* of circuit 1 and thereafter an output issues from AND circuit A2. The output from AND circuit A2 is applied to circuit 2 through OR circuit 01 and circuit 2 reverses its state to issue an output from section 2*b*. Circuit 3 remains as it is, in other words, outputs are obtained from sections 1*a*, 2*b* and 3*a*. When the third pulse is applied to terminal I, circuit 1 reverses its state to issue an output from section 1*b* and circuits 2 and 3 remain as they are, in other words, outputs are obtained from sections 1*b*, 2*b* and 3*a*. When the fourth pulse is applied to terminal I, circuit 1 reverses its state to issue an output from section 1*a*, circuit 2 also reverses its state to issue an output from section 2*a* and circuit 3 too reverses its state to issue an output from section 3*b*. In other words, outputs are obtained from sections 1*a*, 2*a* and 3*b*. When the fifth pulse is applied to terminal I, circuit 1 reverses its state to issue an output from section 1*b*, circuits 2 and 3 remain as they are, in other words, outputs are obtained from sections 1*b*, 2*a* and 3*b*. These three outputs are applied to AND circuit A5 together with the signal at terminal A and the output of AND circuit A5 is applied to flip-flop circuit 4 as a set signal through OR circuit 03 to issue an output from section 4*b* through a wire 5. The output of flip-flop circuit 4 is applied to AND circuit A10 together with the signal at terminal A to issue an output. The output of AND circuit A10 is applied to circuits 2 and 3 and reverses the output states of such two circuits to issue outputs from sections 2*b* and 3*a* thereof, respectively. The present output states of circuits 1 to 3 and flip-flop circuit 4 are the same as the output state obtained when the 11th pulse is applied to a counting circuit without having a feedback circuit, which output state corresponds to the output states obtained by skipping the output states obtained when the fifth to 10th pulses are applied. Briefly, when the sixth pulse is applied to terminal I, outputs are obtained from sections 1*a*, 2*a*, 3*b* and 4*b*. Upon the application of the seventh pulse to terminal I, outputs are obtained from 1*b*, 2*a*, 3*b* and 4*b*. With the eighth pulse on terminal I, outputs are obtained from 1*a*, 2*b*, 3*b* and 4*b*. With the ninth pulse on terminal I, outputs are obtained from 1*b*, 2*b*, 3*b* and 4*b*. When the tenth pulse is applied to terminal I, circuits 1 to 3 reverse their state to issue outputs from sections 1*a*, 2*a* and 3*a*, respectively. These outputs from sections 1*a*, 2*a* and 3*a* are applied to AND circuit A7 together with the signal at terminal A and the output of AND circuit A7 is applied to flip-flop circuit 4 as a reset signal through OR circuit 04 to issue an output from sections 4*a* through wire 6 connected thereto. All of circuits 1 to 3 and flip-flop circuit 4 thus then function to restore the original output states.

SUBTRACTION

The subtractive operation is now explained hereinafter. As a signal is applied to terminal S, when the first pulse is applied to terminal I, circuit 1 reverses its state to issue an output from section 1*b*. The output from section 1*b* is applied to AND circuit A1 together with the signal at terminal S to issue an output from AND circuit A1. The output from AND circuit A1 is applied to circuit 2 through OR circuit 01 and circuit 2 reverses its state to issue an output from section 2*b*. The output from section 2*b* is applied to AND circuit A3 together with the signal at terminal S to issue an output from AND circuit A3. The output from AND circuit A3 is applied to circuit 3 through OR circuit 02 and circuit 3 reverses its state to issue an output from section 3*b*. In other words, outputs are obtained from sections 1*b*, 2*b* and 3*b*. These three outputs are applied to AND circuit A6 togther with the signal at terminal S and the output of AND circuit A6 is applied to flip-flop circuit 4 as a set signal through OR circuit 03 to issue an output from section 4*b* on terminal 5. All of circuits 1 to 3 and flip-flop circuit 4 are reversed from the original output state. When the second pulse is applied to terminal I, circuit 1 reverses its state to issue an output from section 1*a* and circuits 2 and 3 remain as they are, in other words, outputs are obtained from sections 1*a*, 2*b* and 3*b*. When the third pulse is applied to terminal I, circuit 1 reverses its state to issue an output from section 1*b*, circuit 2 also reverses its state to issue an output from section 2*a* and circuit 3 remains as it is, in other words, outputs are obtained from sections 1*b*, 2*a* and 3*b*. The fourth pulse, from 1*a*, 2*a* and 3*b*. The fifth pulse, from 1*b*, 2*b* and 3*a*. When the sixth pulse is applied to terminal I, circuit 1 reverses its state to issue an output from section 1*a*, circuits 2 and 3 remain as they are, in other words, outputs are obtained from sections 1*a*, 2*b* and 3*a*. These three outputs are applied to AND circuit A8 together with the signal at terminal S and the output of AND circuit A8 is applied to flip-flop circuit 4 as a reset signal through OR circuit 04 to issue an output from section 4*a* on terminal 6. The output of flip-flop circuit 4 is applied to AND circuit A9 together with the signal at terminal S to issue an output. The output of AND circuit A9 is applied to circuits 2 and 3 and reverses the output state of the two circuits to issue outputs from sections 2*a* and 3*b*, respectively. The output states of circuits 1 to 3 and flip-flop circuit 4 in a subtractive operation when six pulses have been applied to terminal I are the same as the output states obtained when the fourth pulse is applied to terminal I in the additive operation, described above. In other words, the output states obtained when the resultant value of a mathematical operation in the additive aperation is 4 are the same as the output states obtained when the resultant value of a mathematical operation in the subtractive operation is 4.

It is to be understood that the principle referred to above applies to the disclosed counting circuit when the resultant values from additive and subtractive operations have the same value, different from 4.

Thus the decimal coded counting circuit constituted by means of 16 coded counting circuits, disclosed above, is not limited to the example but can be applied to a counting circuit coded of any number other than $2^n$ code and using binary coded circuits.

As explained precisely above, provided that the resultant value of a mathematical operation is the same in an additive operation and a subtractive operation, the output states of the unit circuits can be made the same independent of whether the resultant value is derived from an additive operation or from a subtractive operation. The construction of an output circuit in a reversible counting circuit apparatus thus becomes simpler in accordance with the present invetntion.

Although the form of the present invention described herein constitutes a preferred embodiment, it will be understood that changes may be made within the spirit of the present invention limited only by the scope of the appended claims.

What we claim is:

1. A reversible counting circuit apparatus comprising: $(m-1)$ binary coded counting circuits; a flip-flop circuit having first and second sections, said binary coded counting circuits and said flip-flop circuit being constituted to have $2^m$ coded counting capacity and to be able to operate in an arbitrary number other than $2^n$ (where $m>n$) coded counting capacity; a plurality of AND circuits having the outputs of said binary coded counting circuits as their inputs, said AND circuits being also connected to the set input terminal and the reset input terminal of said flip-flop circuit, respectively; and a plurality of feed-back circuits having the inputs thereof connected to the first and second sections of said flip-flop circuit and having the outputs thereof connected to said binary coded counting circuits to reverse them in accordance with the outputs of said first and second sections of the flip-flop circuit, the binary coded counting circuits which provide the output signals thereof as the input signals of said AND circuits, and the binary coded counting circuits which are provided with feedback signals by said feedback circuits, being selected to skip the combination having the same output state of the binary coded counting circuits both in additive operation and in subtractive operation.

2. The reversible counting circuit apparatus of claim 1, comprising a source of an additive operation signal and a source of a subtractive operation signal, different pairs of said AND circuits being connected to the outputs of the respective binary coded counting circuits, circuit means connecting one of each of said pairs of AND circuits to the source of additive operation signal, and circuit means connecting the other of each of said pairs of AND circuits to the source of subtractive operation signal.

3. The reversible counting circuit of claim 2, comprising a plurality of OR circuits, each of the OR circuits being connected to the outputs of a respective pair of AND circuits and to the next succeeding AND circuit.

4. The reversible counting circuit apparatus of claim 3, wherein the set input terminal of the flip-flop circuit is connected to an OR circuit which is connected to the output of two AND circuits, and the reset input terminal of the flip-flop circuit is connected to another OR circuit which is connected to the output of two other AND circuits.

References Cited

UNITED STATES PATENTS

| | | | |
|---|---|---|---|
| 2,880,934 | 4/1959 | Bensky | 235—92 |
| 2,970,759 | 2/1961 | Lanning | 235—92 |

MAYNARD R. WILBUR, *Primary Examiner.*

G. J. MAIER, *Assistant Examiner.*

U.S. Cl. X.R.

328—44